United States Patent [19]
Kishi et al.

[11] Patent Number: 4,669,328
[45] Date of Patent: Jun. 2, 1987

[54] FEED MECHANISM

[75] Inventors: Toru Kishi, Zama; Takashi Saito, Ayase, both of Japan

[73] Assignee: Victor Company of Japan, Ltd., Yokohama, Japan

[21] Appl. No.: 775,181

[22] Filed: Sep. 12, 1985

[30] Foreign Application Priority Data

Sep. 14, 1984 [JP] Japan .............................. 59-193753
Sep. 14, 1984 [JP] Japan .......................... 59-139977[U]

[51] Int. Cl.$^4$ ............................................. F16H 1/04
[52] U.S. Cl. ...................................... 74/422; 74/409; 74/89.19
[58] Field of Search .................. 74/422, 409, 89.17, 74/89.19, 606; 403/12, 13

[56] References Cited

U.S. PATENT DOCUMENTS

| | | | |
|---|---|---|---|
| 2,548,603 | 4/1951 | Hallstrand | 74/409 |
| 2,548,837 | 4/1951 | Wright | 74/422 |
| 3,465,611 | 9/1969 | Yoshiyuki Nakazima et al. | 74/422 |
| 3,888,140 | 6/1975 | MacKelvie | 74/822 X |
| 4,539,857 | 9/1985 | Kako et al. | 74/422 |
| 4,550,626 | 11/1985 | Brouwer | 74/409 |

Primary Examiner—Cornelius J. Husar
Assistant Examiner—Joseph A. Fischetti
Attorney, Agent, or Firm—Pollock, VandeSande & Priddy

[57] ABSTRACT

A feed mechanism for moving a read/write head in a disk drive unit includes a pinion drivable by a motor, a rack held in mesh with the pinion, a support on which the rack is pivotally mounted and which is movable with the rack in a linear direction, and a compression resilient member such as a compression coil spring or a torsion spring having one end fixed to the rack and an opposite end fixed to the support for urging the rack in forced mesh with the pinion and for urging the rack in the linear direction. The feed mechanism also includes a pinion holder fixedly mounted on the rack and extending along the linear direction, the pinion holder having a member disposed in confronting relation to the pinion and spaced therefrom for preventing the rack and the pinion from being thrown out of mesh with each other.

5 Claims, 7 Drawing Figures

400 ,669,328

FEED MECHANISM

BACKGROUND OF THE INVENTION

The present invention relates to a feed mechanism for moving a signal recording and reproducing head in various disk drive units.

The heads for recording and reproducing signals on and from magnetic disks, optical disks, or other information storage disks in various disk drive units are generally coupled to racks held in mesh with pinions on the output shafts of access motors comprising stepping motors, for example. The rack serves to convert the rotary motion of the pinion to linear motion to drive the signal recording and reproducing head in the radial direction of the disk.

In the disk drive units of the aforesaid design, the position of the head on the disk is dependent on the position where the rack and the pinion mesh with each other, and the head is required to access and trace highly narrow recording tracks on the disk. If, therefore, the meshing engagement between the rack and the pinion is rendered unstable, or if there is a substantial amount of backlash or play between the rack and the pinion, then the head fails to follow the desired recording track accurately, resulting in the degradation of reproduced signals.

Another problem with the conventional disk drive units is that the rack may not remain in proper mesh with the pinion due primarily to a small shock externally imposed on the disk drive unit or abrupt start of rotation of the pinion. Should this happen, the movement of the head is subject to an error, or the rack is liable to be thrown out of mesh with the pinion.

SUMMARY OF THE INVENTION

In view of the aforesaid drawbacks of the conventional head feed mechanisms, an object of the present invention is to provide a feed mechanism for moving a head in a disk drive unit through reliable meshing engagement between a motor-driven pinion and a head-supporting rack without allowing any appreciable backlash therebetween.

Another object of the present invention is to provide a feed mechanism for moving a head in a disk drive unit while preventing a motor-driven pinion and a headsupporting rack from being thrown out of mesh with each other.

According to the present invention, a feed mechanism for moving a read/write head in a disk drive unit includes a pinion drivable by a motor, a rack held in mesh with the pinion, a support on which the rack is pivotally mounted and which is movable with the rack in a linear direction, and a compression resilient member such as a compression coil spring or a torsion spring having one end fixed to the rack and an opposite end fixed to the support for urging the rack in forced mesh with the pinion and for urging the rack in the linear direction. The feed mechanism also includes a pinion holder fixedly mounted on the rack and extending along the linear direction, the pinion holder having a member disposed in confronting relation to the pinion and spaced therefrom for preventing the rack and the pinion from being thrown out of mesh with each other.

BRIEF DESCRIPTION OF THE DRAWINGS

The present invention will be described in detail by way of illustrative example with reference to the accompanying drawings, in which.

DETAILED DESCRIPTION

Figure 1:
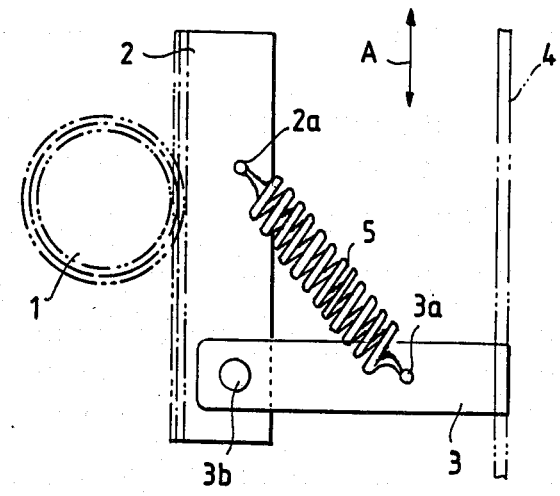
FIG. 1 is a schematic plan view showing the principles of the present invention.

FIG. 1 schematically shows the principles of the present invention. A pinion 1 which is driven by a motor (not shown) is held in driving mesh with the teeth of a rack 2 having one end pivotally supported by a pin 3b on the free end of a cantilevered support 3 movably supported at its other end on a guide rail 4. The support 3 is movable along the guide rail 4 in the directions of the arrow A by rotation of the pinion 1 meshing with the rack 2. A compression resilient member 5 such as a compression coil spring has one end connected to the rack 2 at a position 2a thereon intermediate in the longitudinal direction of the rack 2 and an opposite end connected to the support 3 at a position 3a thereon intermediate in the longitudinal direction of the support 3. The compression resilient member 5 is inclined with respect to both longitudinal axes of the rack 2 and the support 3.

With the compression resilient member 5 thus obliquely attached to the rack 2 and the support 3, the rack 2 is normally biased by the compression resilient member 5 such that the toothed side of the rack 2 is forced against the pinion 1 and the rack 2 is urged with respect to the pinion 1 in the direction in which the rack 2 is driven. Therefore, the rack 2 and the pinion 1 are held in reliable mesh with each other, and firmly intermesh with each other without suffering any appreciable backlash.

Figure 2:
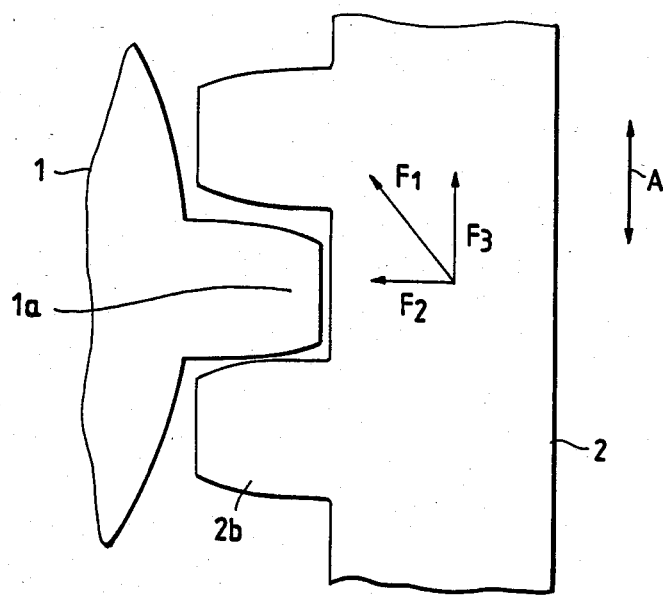
FIG. 2 is an enlarged fragmentary plan view of a rack and pinion illustrated in FIG. 1.

More specifically, as shown in FIG. 2, the compression resilient member 5 imposes a force F1 parallel thereto on the rack 2. The force F1 can be divided into a first component F2 perpendicular to the directions of movement of the rack 2 and a second component F3 parallel to the directions of movement of the rack 2. The first component F2 acts to press the rack 2 against the pinion 1 to keep the rack 2 and the pinion 1 in reliable mesh with each other. The second component F3 acts to force a tooth 2b of the rack 2 against a tooth 1a of the pinion 1. Since the teeth of the rack 2 are therefore successively held in forced engagement with the teeth of the pinion 1, any backlash between the rack 2 and the pinion 1 in the directions of the arrow A is prevented from occurring.

Figure 3:
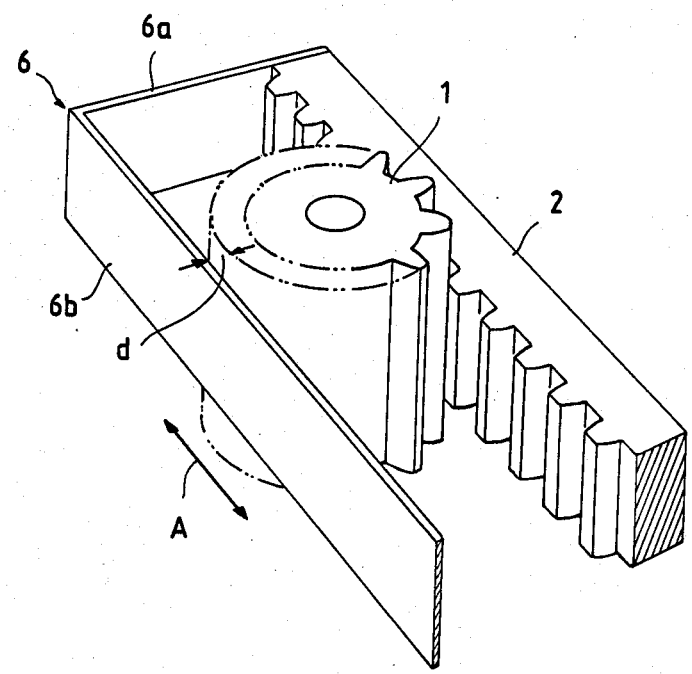
FIG. 3 is a fragmentary perspective view of the rack and pinion of FIG. 2 and a pinion holder plate.

As shown in FIG. 3, an L-shaped pinion holder 6 is attached to the rack 2 for holding the pinion 1 in mesh with the rack 2. In particular, the pinion holder 6 has a shorter arm 6a fixed to the end of the rack 2 remote from the support 3 and a longer arm 6b extending substantially parallel to the rack 2 in the directions of the arrow A. The longer arm 6b is spaced from the pinion 1 by a prescribed distance d. The distance d is selected such that, when the rack 2 or the pinion 1 is subject to a shock tending to move the rack 2 and the pinion 1 apart from each other, the rack 2 is engaged by the longer arm 6b to guard against being thrown out of mesh with the pinion 1.

Figure 5:
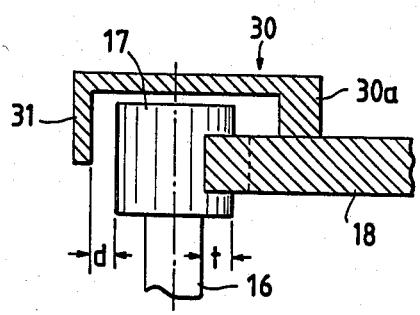
FIG. 5 is a cross-sectional view taken along line V—V of FIG. 4.
Figure 4:
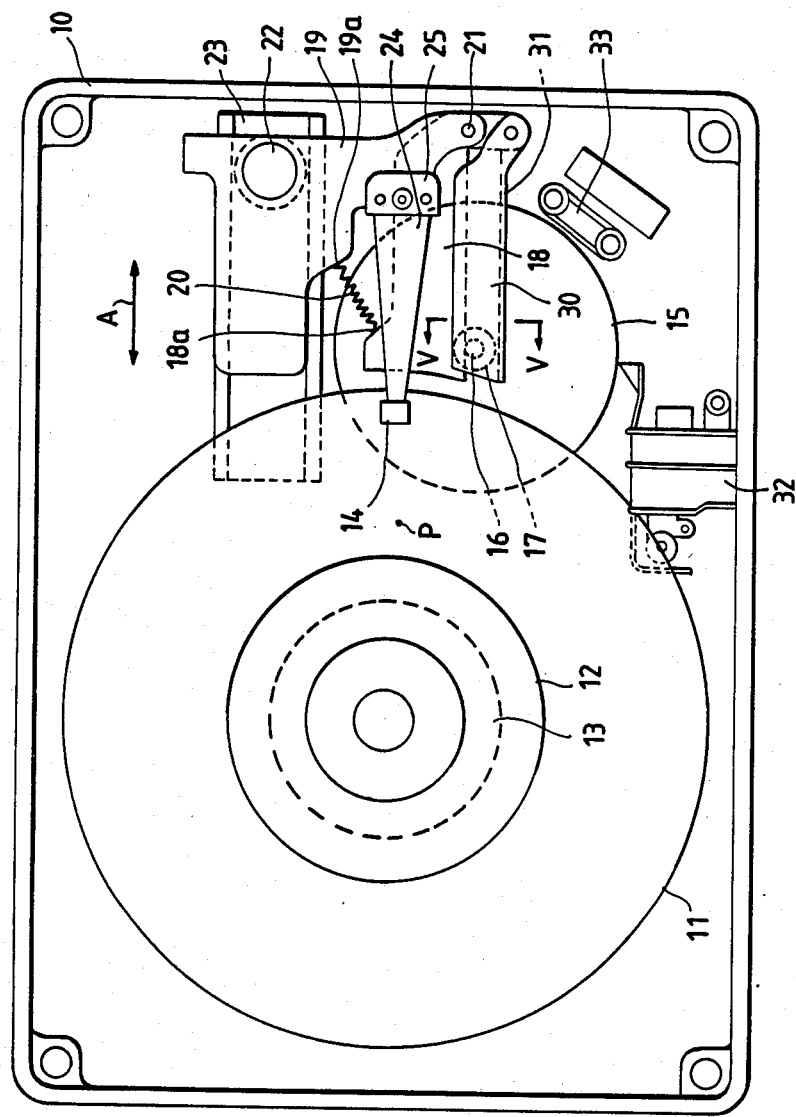
FIG. 4 is a plan view of a feed mechanism according to the present invention, as incorporated in a disk drive unit.

FIGS. 4 and 5 show the specific structural details of a head feed mechanism according to the present invention. The feed mechanism illustrated in FIGS. 4 and 5 is combined with a disk drive unit. Since the illustrated feed mechanism incorporates various actual design considerations, it is somewhat structurally different from, but functionally the same as, the constructions of FIGS. 1 through 3 which are shown primarily for the purpose of illustrating the principles of the present invention.

The disk drive unit shown in FIG. 4 is generally known as a moving-head multiple-platter (MHMP) drive unit. The disk drive unit has a housing 10 filled with clean air and containing a plurality of magnetic disks 11 (only one shown) each supported by a disk holder 12 rotatable by a spindle motor 13 at a high speed. Signals can be recorded on and reproduced from the magnetic disks 11 at a desired location P by a plurality of respective magnetic read/write heads 14 (only one shown) which are linearly movable by a feed mechanism of the invention in a direction radially of the magnetic disks 11 as shown by the arrow A.

The head feed mechanism basically comprises a pinion 17 fixedly mounted on the rotatable output shaft 16 of an access motor 15 in the form of a stepping motor, for example, a rack 18 held in mesh with the pinion 17, a support 19 on which the rack 18 is angularly movably mounted, and a pinion holder 30 fixed to the rack 18. A compression resilient member 20 such as a compression coil spring is attached to and extends between a portion 19a of the support 19 and a portion 18a of the rack 18. The compression coil spring 20 extends obliquely to the directions of the arrow A.

Figure 6:
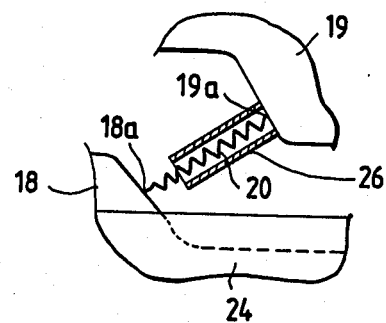
FIG. 6 is an enlarged fragmentary plan view showing a spring holder.

As shown in FIG. 6, the compression coil spring 20 is partly housed in a tubular spring holder 26 mounted at one end on the support 19. The spring holder 26 prevents the compression coil spring 20 from buckling under compression.

The rack 18 is pivotally coupled at one end (shown as the lower end in FIG. 4) to the support 19 by a pin 21. A guide pin 22 is mounted on the support 19 remotely from the pin 21 and is held in engagement with a guide rail 23 extending parallel to the directions of the arrow A. When the pinion 17 is rotated by the motor 15, the rack 18 is driven in mesh with the pinion 17 to move the support 19 linearly in one of the directions of the arrow A.

Each of the magnetic heads 14 is supported on one end of a gimbal arm 24 connected at the other end to the support 19 by means of an arm attachment 25. Therefore, the magnetic head 14 can be moved radially across the corresponding magnetic disk 11 by the rack 18 driven by the pinion 17.

The compression coil spring 20 serves to urge the rack 18 into pressed meshing engagement with the pinion 17 and also to bias the rack 18 with respect to the pinion 1 in the direction radially inward of the disk 11. Therefore, the rack 18 is kept in reliable mesh with the pinion 1 and is prevented from any appreciable backlash with respect to the pinion 1. The magnetic head 14 can thus be driven and positioned accurately on the magnetic disk 11.

The pinion holder 30, which is secured to the rack 18 for movement in unison therewith, extends parallel to the rack 18 in the longitudinal direction thereof. As shown in FIG. 5, the pinion holder 30 has one longitudinal side 30a fixedly mounted on the rack 18 and a depending member 31 on the opposite longitudinal side spaced from the side 30a. The depending member 31 is disposed in confronting relation to the pinion 17 and spaced therefrom by a distance d. The distance d is smaller than the depth t by which the teeth of the rack 18 and the teeth of the pinion 17 are held in mesh with each other. Consequently, the rack 18 and the pinion 17 are prevented from being thrown out of mutual mesh even when they are moved apart under a shock or impact imposed on the rack 18 or the pinion 17 tending to displace the rack 18 and the pinion 17 apart from each other beyond the distance d. The rack 18 and the pinion 17 remain in mesh with each other at all times and will never be forced out of mesh with each other.

The motor 15 can be locked in its rotation by a lock mechanism 32 for positioning the magnetic head 14 over the location on the magnetic disk 11 where signals are to be recorded or reproduced. The speed of rotation of the motor 15 is controlled by a magnetoresistor unit 33. The magnetoresistor unit 33 and the magnetic heads 14 are connected to suitable signal processing devices (not shown) through signal transmission lines.

Figure 7:
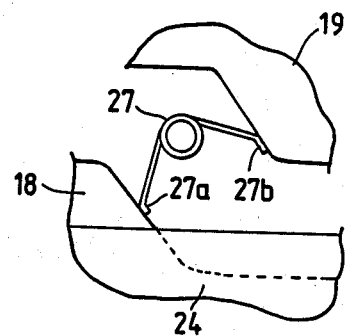
FIG. 7 is an enlarged fragmentary plan view showing an alternative compression resilient member.

FIG. 7 shows another embodiment in which a torsion spring 27 is employed to bias the rack 18. The torsion spring 27 has an end 27a fixed to the rack 18 and the other end 27b fixed to the support 19.

Although certain preferred embodiments of the present invention have been shown and described in detail, it should be understood that various changes and modifications may be made therein without departing from the scope of the appended claims.

We claim:

1. A feed mechanism comprising:
    (a) a pinion drivable to rotate about its own axis;
    (b) a rack held in mesh with said pinion;
    (c) a support on which said rack is pivotally mounted and which is movable with said rack in a linear direction;
    (d) a compression resilient member having one end fixed to said rack and an opposite end fixed to said support for normally urging said rack in forced mesh with said pinion and for urging said rack in said linear direction; and
    (e) a pinion holder fixedly mounted on said rack and extending along said linear direction, said pinion holder including a depending member in confronting relation to said pinion, said pinion being disposed between said rack and said depending member, said depending member being spaced from said pinion by a distance smaller than the depth by which said rack and said pinion mesh with each other, for preventing said rack and said pinion mesh being thrown out of mesh with each other.

2. A feed mechanism according to claim 1, wherein said compression resilient member comprises a compression coil spring extending obliquely to said linear direction.

3. A feed mechanism according to claim 2, including a tubular spring holder mounted on said support, said compression coil spring being partly housed in said tubular spring holder.

4. A feed mechanism according to claim 1, wherein said compression resilient member comprises a torsion spring.

5. A feed mechanism according to claim 1, wherein said pinion holder includes a first longitudinal side fixedly mounted on said rack, said depending member being on an opposite second longitudinal side thereof spaced from said first longitudinal side.

* * * * *